United States Patent
Park et al.

(10) Patent No.: US 12,233,721 B2
(45) Date of Patent: Feb. 25, 2025

(54) POWER SUPPLY SYSTEM FOR AUTONOMOUS VEHICLE AND CONTROL METHOD THEREOF

(71) Applicants: Hyundai Motor Company, Seoul (KR); Kia Corporation, Seoul (KR); THN Corporation, Daegu (KR)

(72) Inventors: Sang Wook Park, Hwaseong-si (KR); Je Hyun Kim, Seoul (KR); Young Ho Kim, Seoul (KR); Kuk Hyeon Yoo, Seoul (KR); Oh Kab Kwon, Seoul (KR)

(73) Assignees: Hyundai Motor Company, Seoul (KR); Kia Corporation, Seoul (KR); THN Corporation, Daegu (KR)

( * ) Notice: Subject to any disclaimer, the term of this patent is extended or adjusted under 35 U.S.C. 154(b) by 0 days.

(21) Appl. No.: 18/213,637

(22) Filed: Jun. 23, 2023

(65) Prior Publication Data
US 2024/0166054 A1  May 23, 2024

(30) Foreign Application Priority Data
Nov. 21, 2022 (KR) .......................... 10-2022-0156580

(51) Int. Cl.
*B60L 3/04* (2006.01)
*B60L 3/00* (2019.01)
*B60L 58/12* (2019.01)
*B60L 58/22* (2019.01)

(52) U.S. Cl.
CPC .............. *B60L 3/04* (2013.01); *B60L 3/0046* (2013.01); *B60L 58/12* (2019.02); *B60L 58/22* (2019.02); *B60L 2210/10* (2013.01); *B60L 2240/547* (2013.01)

(58) Field of Classification Search
CPC .. B60L 3/04; B60L 50/22; B60L 58/12; B60L 3/0046; B60L 2210/10; B60L 2240/547
USPC .......................................................... 307/9.1
See application file for complete search history.

(56) References Cited

U.S. PATENT DOCUMENTS

| | | | |
|---|---|---|---|
| 2015/0258948 A1* | 9/2015 | Planas | H02J 1/14 307/10.6 |
| 2021/0006066 A1* | 1/2021 | Takemoto | H02M 1/36 |
| 2021/0242712 A1* | 8/2021 | Izawa | B60R 16/033 |
| 2022/0140647 A1* | 5/2022 | Takahashi | H02J 9/068 307/64 |
| 2022/0355704 A1* | 11/2022 | Carlson | H02J 7/007182 |
| 2023/0318345 A1* | 10/2023 | Morita | B60L 1/00 320/163 |

* cited by examiner

*Primary Examiner* — Michael R. Fin
(74) *Attorney, Agent, or Firm* — Slater Matsil, LLP

(57) ABSTRACT

In an embodiment a power supply system includes a low voltage DC/DC converter (LDC) configured to convert a high voltage into a low voltage, a main battery configured to be charged by the LDC and to supply power to a junction block divided into an essential load part and a general load part, a control block comprising a first power switch configured to control power between the LDC and the junction block, a second power switch configured to control the power between the main battery and the junction block, and a load switch configured to selectively cut off the power to the general load part and an auxiliary battery configured to selectively supply power to an auxiliary junction block.

17 Claims, 11 Drawing Sheets

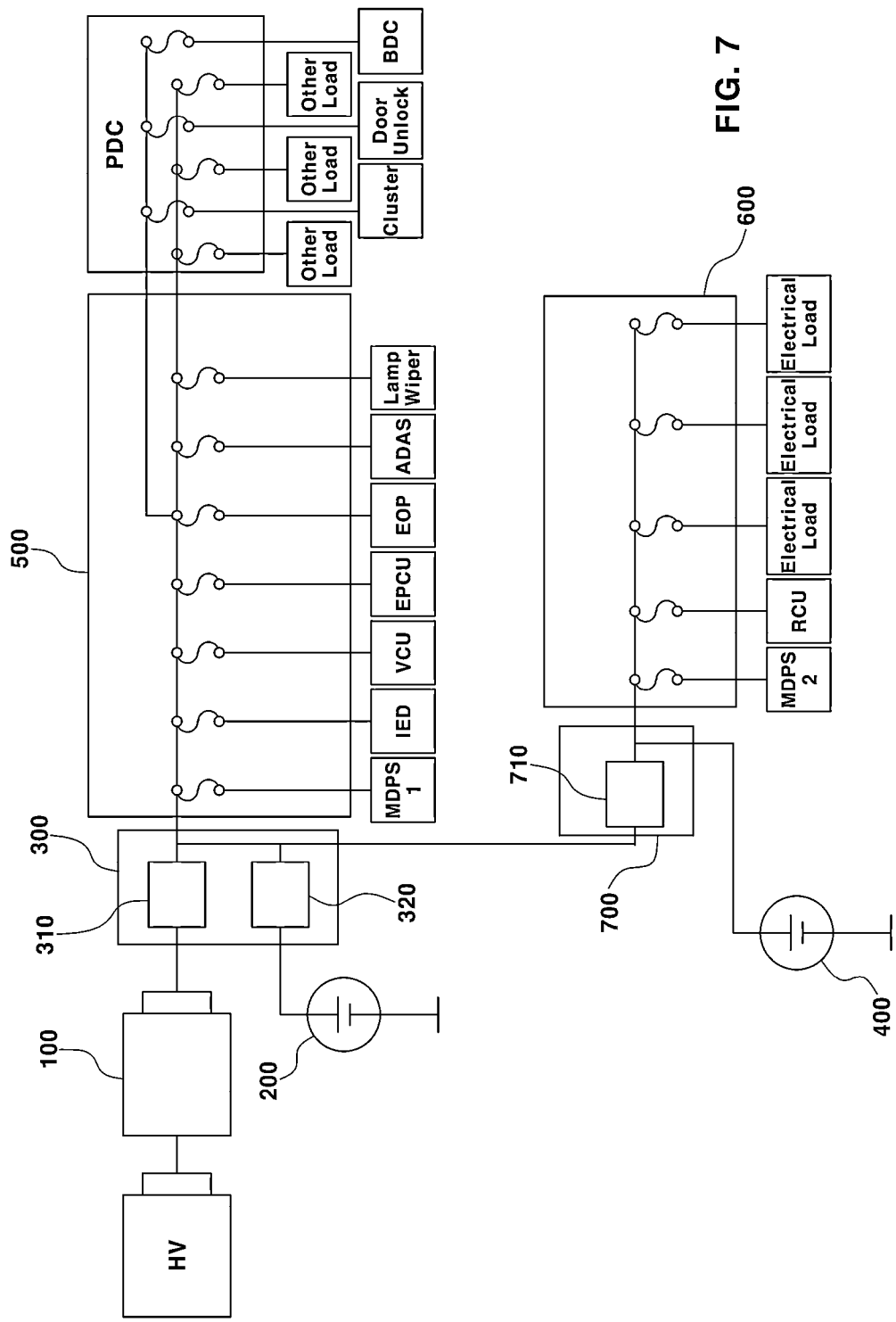

POWER SUPPLY SYSTEM FOR AUTONOMOUS VEHICLE AND CONTROL METHOD THEREOF

CROSS-REFERENCE TO RELATED APPLICATIONS

The present application claims priority to Korean Patent Application No. 10-2022-0156580, filed Nov. 21, 2022, the entire contents of which are incorporated herein for all purposes by this reference.

TECHNICAL FIELD

The present disclosure relates generally to a power supply system for an autonomous vehicle and a control method thereof and, more particularly, to a power supply system for an autonomous vehicle and a control method thereof, the system and the method enabling supply of power to essential loads be reliably performed by optimizing the supply of power in a situation such as a failure of a low voltage DC/DC converter, a failure of a battery, or power shortage.

BACKGROUND

Generally, due to enhanced environmental regulations to vehicles, the arrival of the era of high oil prices, etc., improvement in fuel efficiency has continuously been demanded in the vehicle-related industry, and a variety of research and development has been performed in response to such changes in paradigm.

Recently, research and development into a variety of solutions for improving fuel efficiency have been carried out in order to cope with enhanced environmental regulations to vehicle manufacturers, such as Corporate Average Fuel Economy (CAFE). As an example of such technological development, development of electric vehicles (EVs) using a battery, hybrid EVs, and the like have been actively considered.

In particular, due to the project of establishment of foundation for commercialization of intelligence vehicles and with increases in the autonomous vehicle market, investment on autonomous vehicles has been continued in the Republic of Korea. However, there are still a number of problems before autonomous vehicles are commercialized.

In order to reduce or overcome these problems, a variety of companies in Korea are working on research, but the technological level of unmanned vehicles in Korea is still relatively low compared to overseas.

In such an autonomous vehicle able to autonomously drive to a set destination by monitoring external information and reviewing road conditions by itself without being controlled by a driver, power efficiency is important, since more power is applied to a variety of sensors and a computing system compared to other vehicles.

That is, since the autonomous vehicle drives using a variety of sensors, a micro control units (MCU) within the vehicle, a steering device, etc., when there is a problem with an internal power source, absence of power in the variety of sensors, the steering device, a brake, etc. may lead to a severe accident.

In a power generation system in an autonomous vehicle of the related art, when a main power source of an ECU configured to control the vehicle is cut off during driving of the vehicle due to an internal defect or an external factor, a severe problem may be caused. To prevent the problem that may occur when the main power source of the autonomous vehicle is cut off, an integrated dynamic brake (IDB), a motor driven power steering (MDPS) device, an electronic control unit (ECU), and an auxiliary power system configured to supply power to sensors are required as minimum devices for emergency braking of the autonomous vehicle. However, an auxiliary power system configured to support power to the IDB, the MDPS, the ECU, and the sensors serving as minimum devices for emergency braking of the autonomous vehicle when the main power source of the autonomous vehicle is abnormal has not yet been developed.

As a similar system, when a user convenience device and a safety device, such as a black box, are additionally attached to the vehicle, the capacity of the main power source of the vehicle may be insufficient to power these devices, and an auxiliary battery may be mounted on the vehicle by customization.

In other words, the power generation system in the autonomous vehicle of the related art may not supply of power in a situation in which emergency braking is required, thereby causing a severe problem to the safety of the autonomous vehicle.

The foregoing is intended merely to aid in the understanding of the background of the present disclosure, and is not intended to mean that the present disclosure falls within the purview of the related art that is already known to those skilled in the art.

SUMMARY

Embodiments provide a power supply system for an autonomous vehicle and a control method thereof, wherein when a low voltage DC-DC converter (LDC) has failed, power is supplied to the vehicle through the battery, and when the voltage of the battery is reduced or the voltage of the battery is insufficient for an emergency mode operation for stopping in the safe zone, the essential load switch is controlled so that the supply of power to some loads is selectively cut off, whereby the supply of power may be converted to the essential loads to obtain the safety of the driver.

Embodiments provide a power supply system for an autonomous vehicle. The power supply system may include: a low voltage DC/DC converter (LDC) configured to converting a high voltage supplied into a low voltage; a main battery configured to be charged using the LDC and supply power to a junction block divided into an essential load part and a general load part; a control block including a first power switch configured to control supply of power between the LDC and the junction block, a second power switch configured to control supply of power between the main battery and the junction block, and a load switch configured to selectively cut off supply of power to the general load part; and an auxiliary battery configured to selectively supply power to an auxiliary junction block.

When a short circuit has occurred in the LDC, the control block may turn off the first power switch and turns on the second power switch so that power is supplied to the junction block.

The first power switch may be turned off in response to a short circuit in the LDC, and when the state of charge (SOC) of the main battery is determined to be less than a predetermined reference SOC, the control block may turn off the load switch so that power from the main battery is only supplied to the essential load part.

The control block may turn off the second power switch in response to a short circuit in the main battery and cause power to be supplied from the LDC to the junction block.

The control block may turn off the first power switch and the second power switch in response to a short circuit in the LDC and the main battery and cause power to be supplied from the auxiliary battery to the junction block and the auxiliary junction block.

The power supply system may further include an auxiliary control block configured to supply power from the auxiliary battery to the auxiliary junction block. When a short circuit has occurred in the LDC, the auxiliary control block may control power from the auxiliary battery to be selectively supplied from the auxiliary battery to the main battery.

When the short circuit has occurred in the LDC, the auxiliary control block may compare a voltage of the main battery and a voltage of the auxiliary battery and selectively control flow of current in a forward direction or a reverse direction using a converter disposed therein.

When the voltage of the main battery is greater than the voltage of the auxiliary battery, the auxiliary control block may control current to flow through the converter in the forward direction, whereby the auxiliary battery is charged using the main battery, and supply power to the junction block using the main battery, whereby the vehicle moves in an emergency mode.

In a situation in which the control block allows the vehicle to move in the emergency mode, when the SOC of one of the main battery is determined to be less than a predetermined reference SOC, the control block may turn off the load switch so that power is only supplied to the essential load part.

When the voltage of the auxiliary battery is greater than the voltage of the main battery, the auxiliary control block may control flow of current through the converter in the reverse direction, whereby the main battery is charged using the auxiliary battery and supplies power to the junction block using the auxiliary battery, whereby the vehicle moves in an emergency mode.

In a situation in which the control block allows the vehicle to move in the emergency mode, when the of the auxiliary battery is determined to be less than the predetermined reference SOC, the control block may turn off the load switch so that power is only supplied to the essential load part.

When the short circuit has occurred in the LDC, the auxiliary control block may selectively control a turned-on state of a third power switch provided therein.

The LDC may include a plurality of LDCs connected to the control block and the auxiliary junction block, respectively.

Embodiments further provide a power supply control method for an autonomous vehicle. The power supply control method may include: determining whether or not a short circuit has occurred in a low voltage DC/DC converter (LDC) by monitoring power, such as a voltage or current, to a control block; when the short circuit is determined to have occurred in the LDC in accordance with monitoring information in the determination of whether or not the short circuit has occurred in the LDC, turning off a first power switch of the control block; when no short circuit is determined to have occurred in the LDC in accordance with the monitoring information in the determination of whether or not the short circuit has occurred in the LDC, determining whether or not a short circuit has occurred in a main battery configured to supply power to a junction block; when determining whether or not the short circuit has occurred in the main battery by monitoring power, turning off a second power switch of the control block and controlling an auxiliary battery through an auxiliary control block to supply power to the junction block and the auxiliary junction block; and when no short circuit has occurred in the LDC or the main battery, determining that an internal power network of a power supply system is abnormal, turning off the first power switch and the second power switch to prevent power from being supplied from the auxiliary battery to the junction block, and supplying power from the auxiliary battery to the auxiliary junction block, whereby an autonomous vehicle moves in an emergency mode.

When the short circuit has occurred in the LDC, the turning-off of the first power switch may include comparing a voltage of the main battery and a voltage of the auxiliary battery and selectively controlling flow of current in a forward direction or a reverse direction using a converter disposed inside the auxiliary control block.

When the voltage of the main battery is greater than the voltage of the auxiliary battery, the turning-off of the first power switch may include controlling current to flow through the converter in the forward direction, whereby the auxiliary battery is charged using the main battery, and supplying power to the junction block using the main battery, whereby the vehicle moves in an emergency mode.

In a situation in which the control block allows the vehicle to move in the emergency mode, when the SOC of one of the main battery is determined to be less than a predetermined reference SOC, the turning-off of the first power switch may include turning off the load switch so that power is only supplied to an essential load part among the essential load part and a general load part of the junction block.

When the voltage of the auxiliary battery is greater than the voltage of the main battery, the turning-off of the first power switch may include controlling flow of current through the converter in the reverse direction, whereby the main battery is charged using the auxiliary battery, and supplying power to the junction block using the auxiliary battery, whereby the vehicle moves in an emergency mode.

In a situation when the voltage of the main battery is determined to be less than the predetermined reference SOC, the turning-off of the first power switch may include turning off the load switch so that power is only supplied to an essential load part among the essential load part and a general load part of the junction block.

According to embodiments, when the LDC has a failure, power is supplied to the vehicle through the battery. When the voltage of the battery is reduced or the voltage of the battery is insufficient for an emergency mode operation for stopping in the safe zone, the essential load switch is controlled so that the supply of power to some loads is selectively cut off. Consequently, the supply of power may be converted to the essential loads to obtain the safety of the driver.

Accordingly, embodiments may remove a risk in the autonomous vehicle resulting from no supply of power to the essential loads, thereby providing stability to the driving vehicle.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 6-7 are diagrams illustrating problems occurring in a related-art structure of the power supply system for an autonomous vehicle;

DETAILED DESCRIPTION OF ILLUSTRATIVE EMBODIMENTS

Hereinafter, exemplary embodiments of the present disclosure will be described in detail with reference to the accompanying drawings.

The above and other advantages and features of the present disclosure, as well as methods for realizing the same, will be more clearly understood from the following detailed description of embodiments when taken in conjunction with the accompanying drawings.

However, the present disclosure is not limited to specific embodiments to be described hereinafter but may be embodied in a variety of different forms. Rather, these embodiments are provided so that the description of the present disclosure will be complete and will fully convey the scope of the present disclosure to those skilled in the technical field to which the present disclosure pertains. The present disclosure shall be defined by the scope of the Claims.

Further, in the following description of the present disclosure, a detailed description of known technology or the like will be omitted in the situation in which the subject matter of the present disclosure may be rendered rather unclear thereby.

Figure 1:
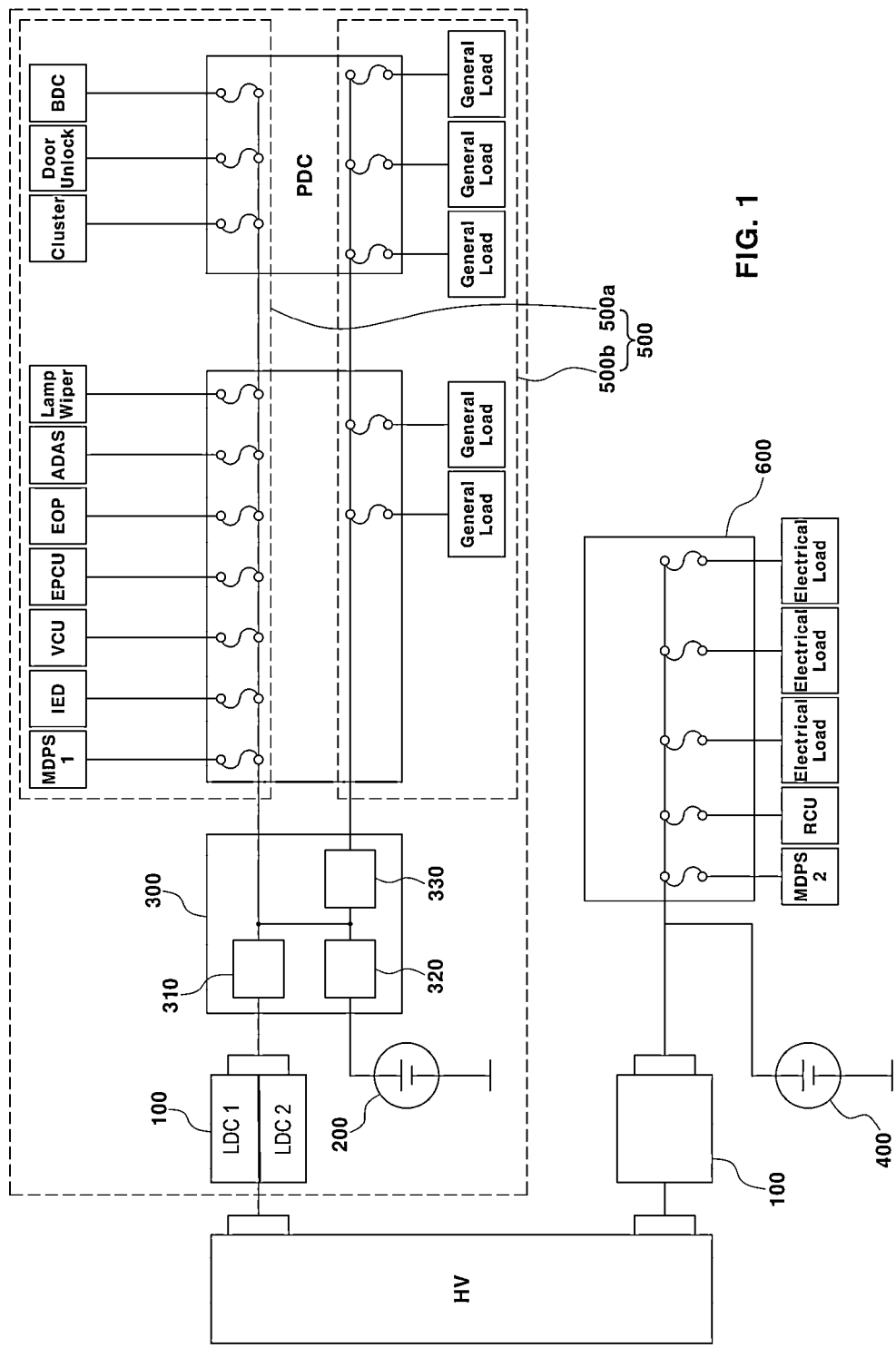
FIG. 1 is a diagram illustrating a structure of a first embodiment of a power supply system for an autonomous vehicle.
Figure 2A:
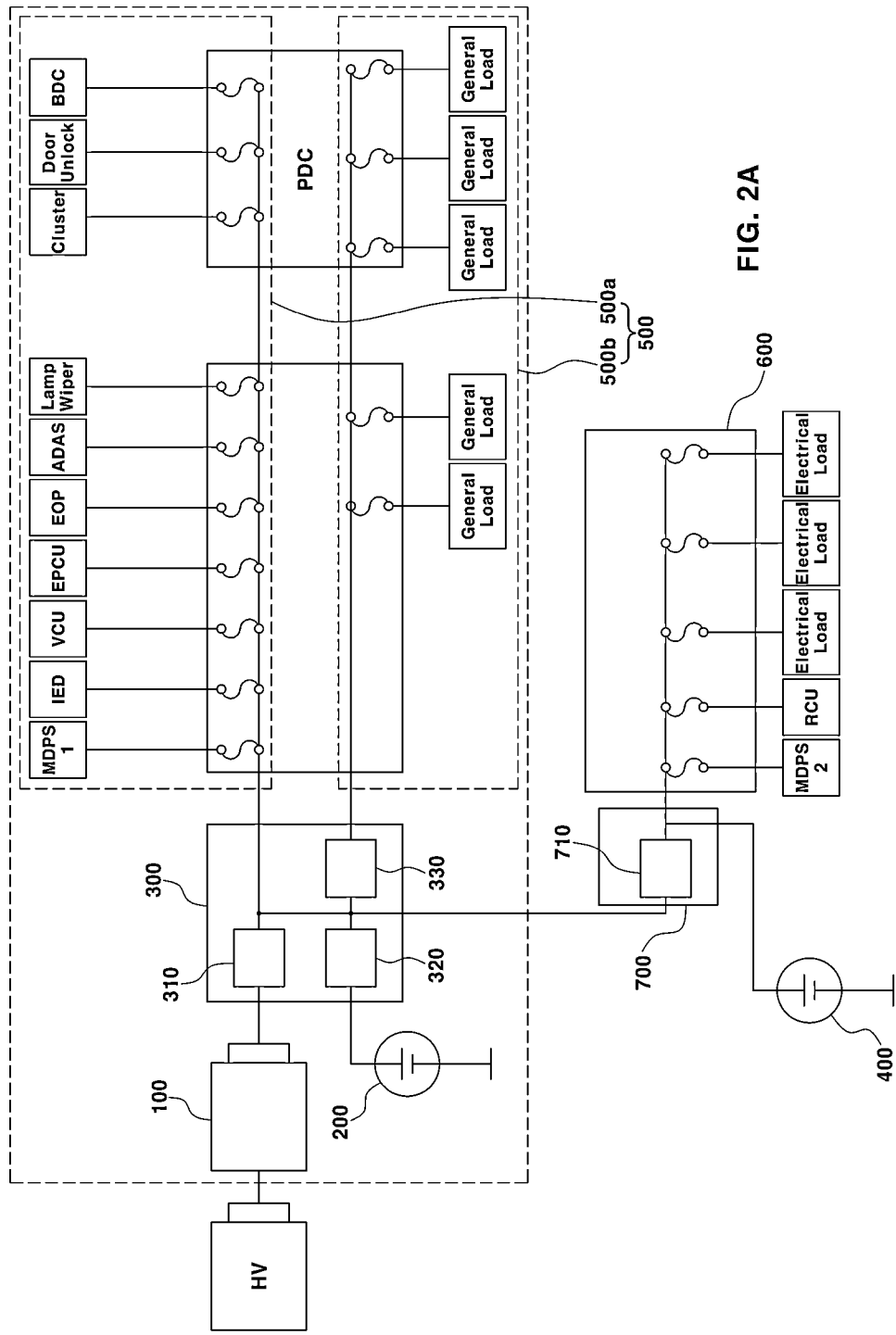
FIGS. 2A-2B are diagrams illustrating structures of a second embodiment of the power supply system for an autonomous vehicle.
Figure 2B:
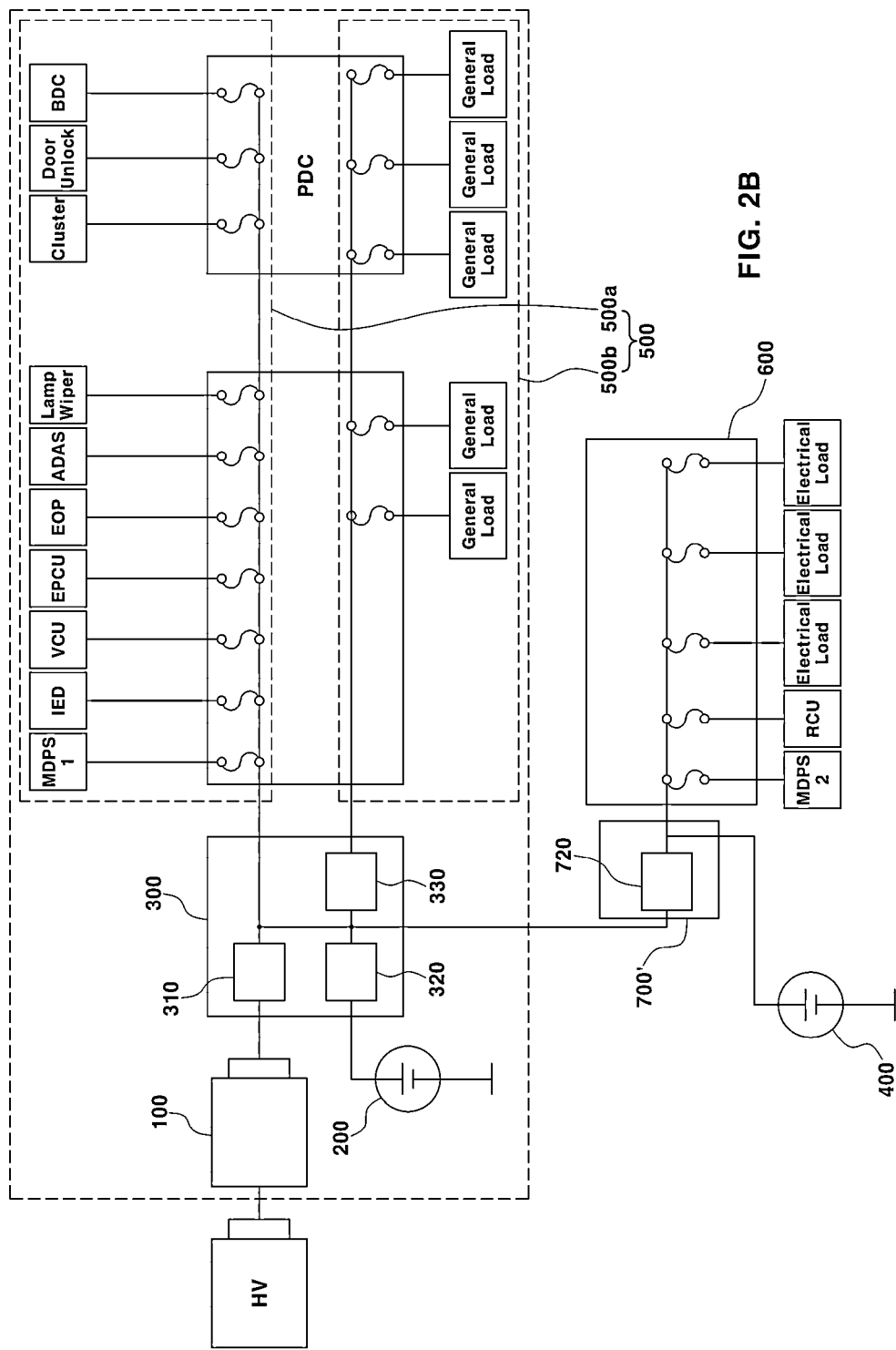

FIG. 1 is a diagram illustrating a structure of a first embodiment of a power supply system for an autonomous vehicle according to an embodiment of the present disclosure, and FIGS. 2A and 2B are diagrams illustrating structures of a second embodiment of the power supply system for an autonomous vehicle according to the embodiment of the present disclosure.

Figure 3:
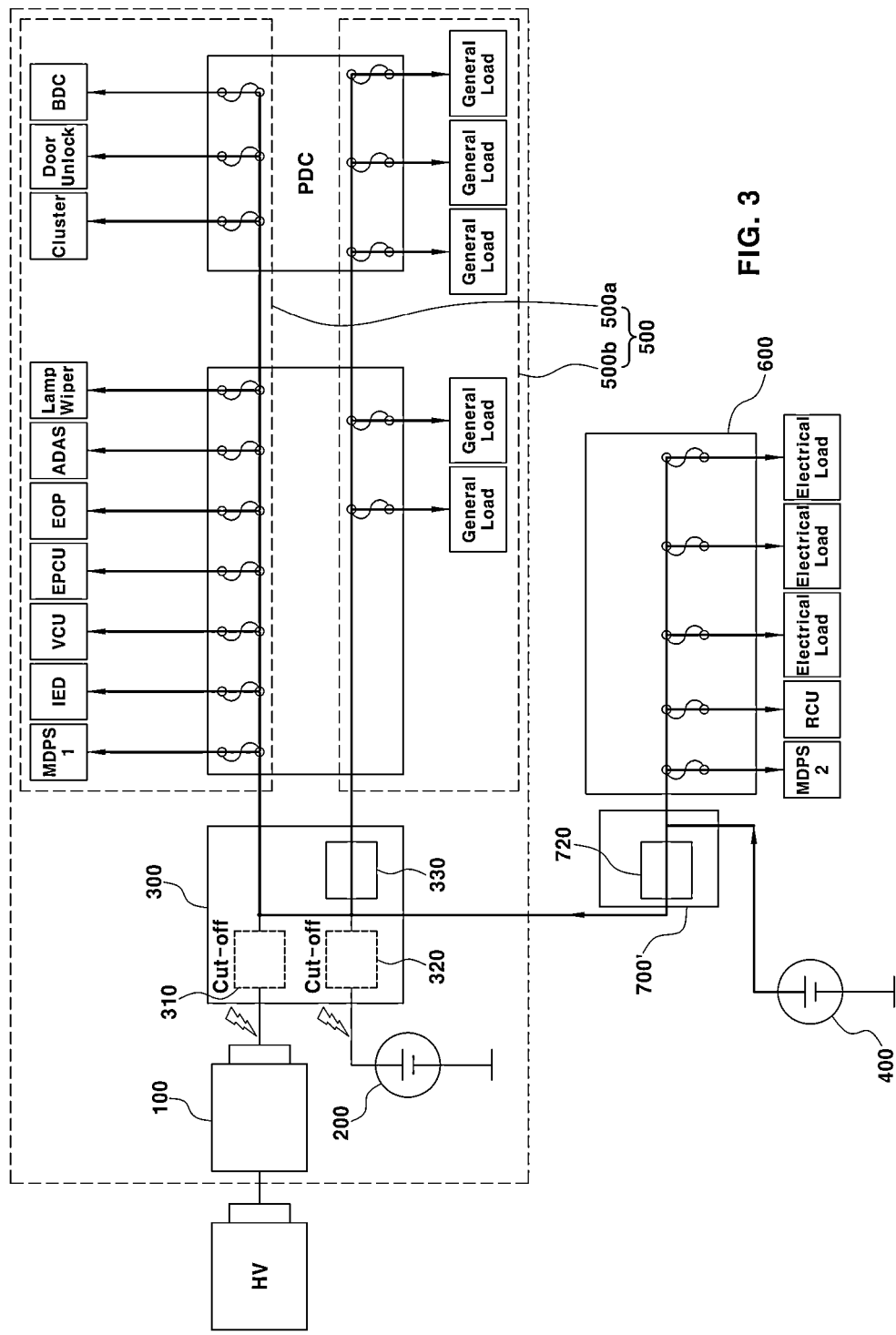
FIGS. 3-5 are diagrams illustrating a failure scenario in the second embodiment of the power supply system for an autonomous vehicle.
Figure 4:
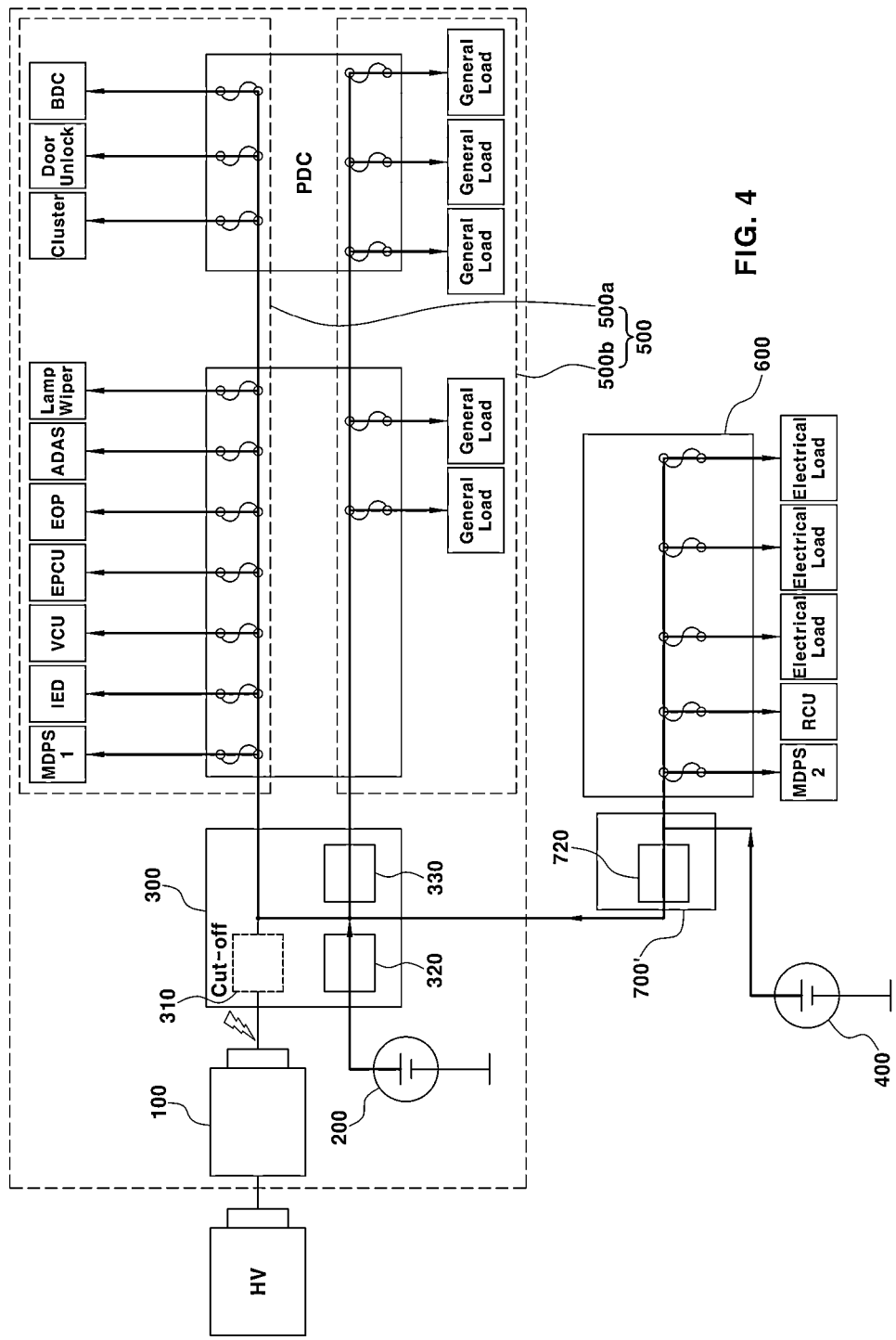
Figure 5:
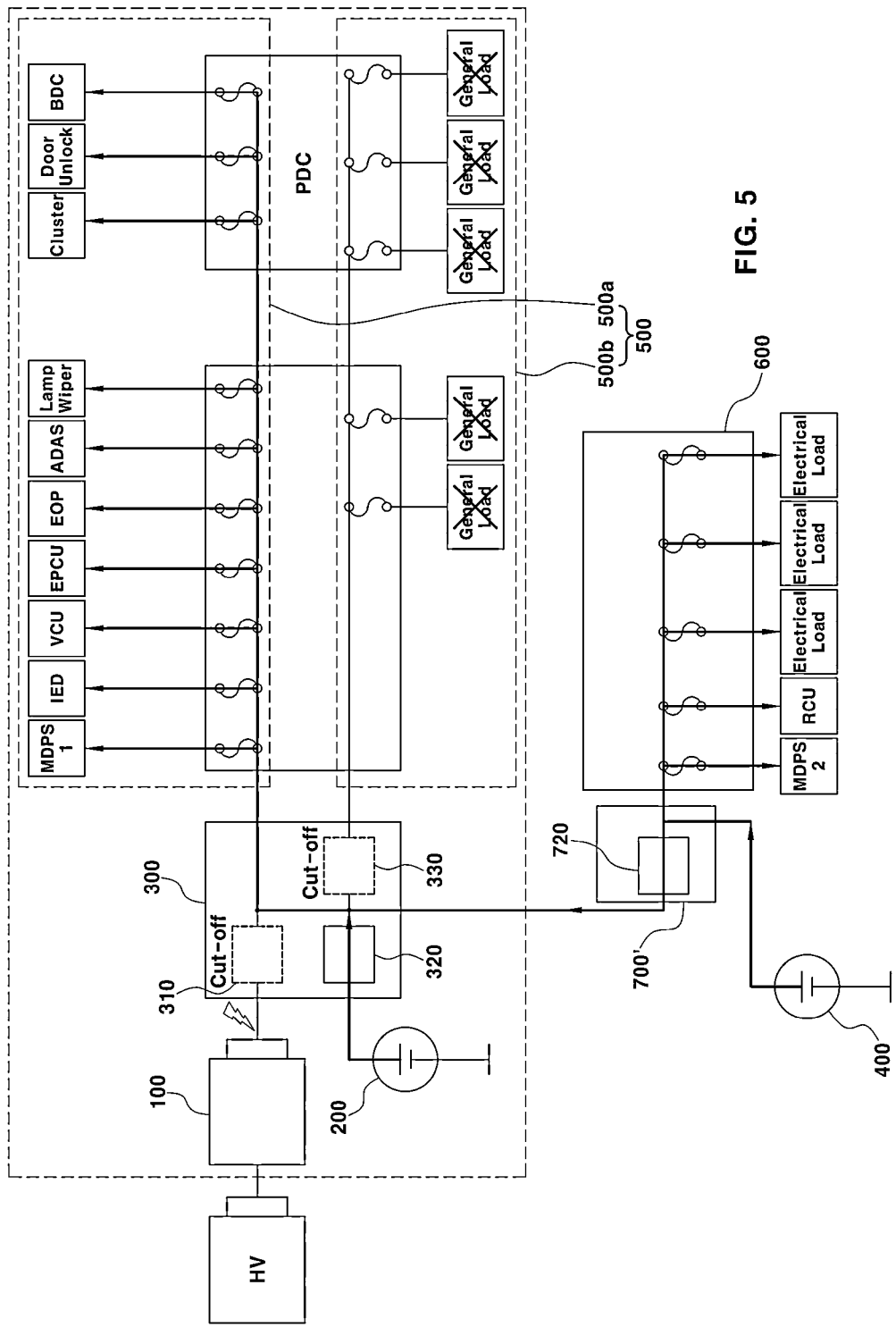
Figure 6:
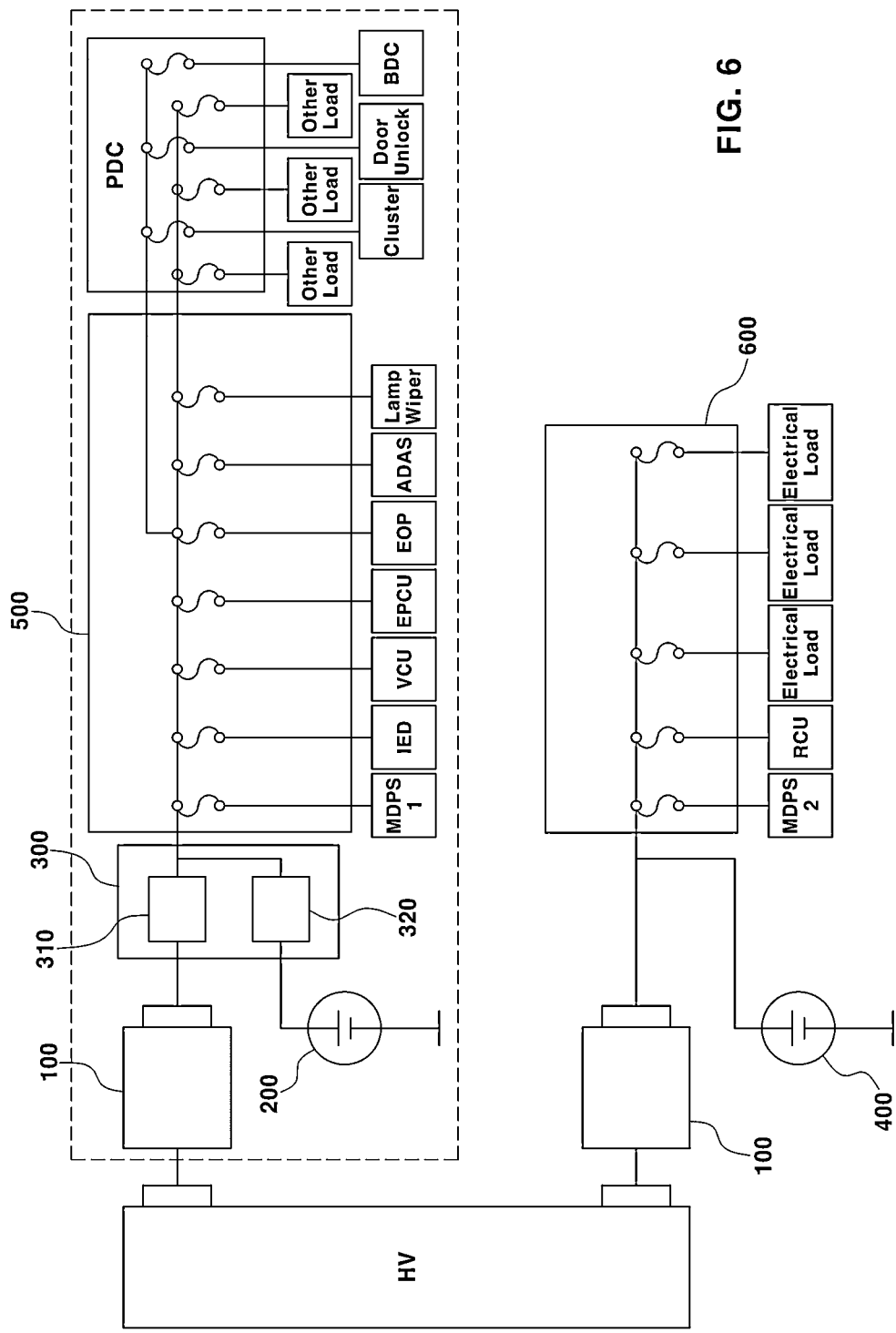

In addition, FIGS. 3 to 5 are diagrams illustrating a failure scenario in the second embodiment of the power supply system for an autonomous vehicle according to the embodiment of the present disclosure, and FIGS. 6 and 7 are diagrams illustrating problems occurring in a related-art structure of the power supply system for an autonomous vehicle according to the embodiment of the present disclosure.

Typically, in a power supply system of an autonomous vehicle, when main power of an electronic control unit (ECU) configured to control the autonomous vehicle is cut off during driving of the autonomous vehicle due to an internal defect or an external factor, a severe problem may occur.

In this regard, as illustrated in FIGS. 6 and 7, the autonomous vehicle is provided with a low voltage DC-DC converter (LDC) or two batteries as a power source within the vehicle to supply power from the power source to respective electric components within the vehicle.

That is, such an autonomous vehicle is required to operate two LDCs and two batteries to obtain a redundancy power source according to the technology of autonomous driving level 3.5 and meet relevant laws and regulations (see FIG. 6). Here, an auxiliary junction block may be connected to the second LDC and the auxiliary battery, driving-related redundancy loads, such as MDPS2 and a redundancy brake control unit (RCU), may be connected to the auxiliary junction block, and power may be supplied to the auxiliary junction block. Even in the case that related units are damaged due to an accident of the vehicle or the like, the vehicle may drive to a safe zone to stop using the auxiliary junction block.

In other words, when a short circuit occurs at a high current wiring terminal in the rear end of the LDC, an instability in power supply is detected. Thus, supply of power from the LDC and the main battery to the junction block is cut off, and only the driving-related redundancy loads (e.g., MDPS2 and RCU) connected to the other LDC is supplied with power. In this case, since the supply of power to the junction block is cut off, the engine of the vehicle is turned off and the vehicle may only be allowed to drive by coasting for several seconds to pull over. At this time, none of safety-related loads, such as an airbag, a cluster, lamps, and wipers, may operate ordinarily due to power cut off.

More specifically, when a short circuit has occurred in the LDC, both the junction block and the PDC may be ordinarily supplied with power in the same manner as before the occurrence of the short circuit, whereby the driver may drive the vehicle. However, when the loads connected to the junction block and the PDC use 100 A or more from the capacity of the main battery, the vehicle may only operate for about 10 minutes or shorter (see FIG. 6).

In addition, in another structure, when a short circuit in the LDC is detected, the junction block and the PDC may be ordinarily supplied with power by the main battery and the auxiliary battery, whereby the vehicle may drive in the same manner as before the occurrence of the short circuit. That is, when the short circuit has occurred in the rear end of the LDC, optimum charging/discharging control between the main battery and the auxiliary battery may be performed by forward-backward mode conversion depending on the state of charge (SOC) of each battery between main battery and the auxiliary battery. In this manner, the vehicle may drive in the same manner as before the occurrence of the short circuit. However, when the loads connected to the junction block and the PDC use 150 A or more from the capacity of the main battery and the auxiliary battery, the vehicle may only operate for about 10 minutes or shorter (see FIG. 7).

As described above, the power supply system for an autonomous vehicle according to the present embodiment is configured to increase a normal operation time in the case of detecting a short circuit in the LDC, the main battery, etc. In this regard, the power supply system includes: an LDC 100, a main battery 200, a control block 300, and an auxiliary battery 400.

The LDC 100 converts a high voltage supplied by an external power supply into a low voltage, and the rear end of the LDCs 100 is connected to the control block 300. The LDC 100 allows power to be supplied to a junction block 500 divided into an essential load part 500*a* and a general load part 500*b*.

Since two LDCs 100 may be provided as illustrated in FIG. 1, the power supply system may be configured to supply power from the LDCs 100 and the batteries 200 and 400 to the junction block 500 and an auxiliary junction block 600, respectively. In addition, as illustrated in FIGS. 2A and 2B, the power supply system may be configured such that auxiliary control blocks 700 and 700' are connected to a single LDC 100 and the auxiliary junction block 600 so that the junction block 500 and the auxiliary junction block 600 may be supplied with power from the LDC 100 and the batteries 200 and 400.

The main battery 200 is charged through the LDC 100, and supplies power to the junction block 500.

In the structure illustrated in FIG. 1, the main battery 200 is implemented as a lithium ion battery. In the structures illustrated in FIGS. 2A and 2B, the main battery 200 may be substituted with a lead-acid battery to reduce cost compared to the existing lithium ion battery.

The control block 300 includes a first power switch 310 configured to control supply of power between the LDC 100 and the junction block 500, a second power switch 320 configured to control supply of power between the main battery 200 and the junction block 500, and a load switch configured to selectively cut off supply of power to the general load part 500b.

In addition, the auxiliary battery 400 is configured to selectively supply power to the auxiliary junction block 600 to which the driving-related redundancy load, such as MDPS2 or RCU, is connected.

Here, when a short circuit has occurred in the LDC 100, the control block 300 turns off the first power switch 310 and turns on the second power switch 320 so that power is supplied to the essential load part 500a and the general load part 500b of the junction block 500.

That is, the control block 300 performs power monitoring for a voltage and current. When an abnormality has occurred in the power or a short circuit has occurred in a high current wiring connected to the LDC 100 among high current wirings connected to the LDC 100 and the main battery 200, respectively, due to an accident such as a vehicle collision, the control block 300 turns off the first power switch 310 so that power may be stably supplied from the main battery 200 to a controller of the vehicle in a state in which the second power switch 320 is turned on.

In addition, the control block 300 selectively turns off the load switch 330 to cuts off supply of power to the general load part 500b, and allows only the essential load part 500a including a load for a safe emergency stop, a load for securing the driver's safety in an emergency, a driving-related load, etc. to be supplied with power.

In other words, since the main battery 200 is implemented as a lead-acid battery, when a short circuit has occurred in the LDC 100, when power is supplied to the vehicle from the main battery 200, the supply of power to the vehicle is possible only for a short time due to a relatively small capacity of the battery. Thus, it is possible to allow power to only be supplied to the essential load part 500a by selectively turning off the load switch 330 from the turned-on state. Consequently, a power supply time in which the vehicle having a failure may drive in the same manner as in a normal situation may be extended.

As a result, the control block 300 cuts off supply of power to the general load part 500b by controlling the load switch 330 and allows power to be stably supplied to the essential load part 500a. In this manner, it is possible to improve driving stability of the vehicle even in an emergency, such as a collision.

In addition, as a short circuit has occurred in the main battery 200, the control block 300 turns off the second power switch 320 and allows power from the LDC 100 to be supplied to the essential load part 500a and the general load part 500b of the junction block 500 through the turned-on first power switch 310.

Also in this case, the control block 300 may selectively turn off the load switch 330 so that supply of power from the LDC 100 is only directed to the essential load part 500a, thereby extending the power supply time in which the vehicle having a failure may drive in the same manner as in a normal situation. In this manner, it is possible to improve driving stability of the vehicle even in an emergency, such as a collision.

In addition, as illustrated in FIG. 3, as a short circuit has occurred in the LDC 100 and the main battery 200, the control block 300 may turn off the first power switch 310 and the second power switch 320 and turn on the load switch 330, thereby allowing power from the auxiliary battery 400 to be supplied to the junction block 500 and the auxiliary junction block 600.

As described above, even in the case that a short circuit has occurred in both the LDC 100 and the main battery 200, the control block 300 may selectively turn off the load switch 330 and allow power from the auxiliary battery 400 to only be supplied to the essential load part 500a of the junction block 500, thereby extending the power supply time in which the vehicle having a failure may drive in the same manner as in a normal situation. In this manner, it is possible to improve driving stability of the vehicle even in an emergency, such as a collision.

In addition, as illustrated in FIGS. 2A and 2B, the power supply system for an autonomous vehicle according to the present embodiment further includes the auxiliary control blocks 700 and 700'.

The auxiliary control block 700 supplies power from the auxiliary battery 400 to the auxiliary junction block 600. When a short circuit has occurred in the LDC 100, the auxiliary control block 700 controls a converter 710 provided therein or a third power switch 720 to selectively supply power from the auxiliary battery 400 to the main battery 200.

Here, the auxiliary control block 700 may have a structure with the converter 710 disposed therein as illustrated in FIG. 2A or a structure with the third power switch 720 disposed therein as illustrated in FIG. 2B. This is determined according to the type of the auxiliary battery 400. When the auxiliary battery 400 is a lead-acid battery, the converter 710 is disposed inside the converter 710. In contrast, when the auxiliary battery 400 is implemented as a lithium ion battery, the third power switch 720 is disposed inside the converter 710, since the lithium ion battery itself includes a DC/DC converter disposed therein. Thus, with the converter 710 disposed therein, the third power switch 720 may realize a redundancy function.

Thus, in the present embodiment according to the structures illustrated in FIGS. 2A and 2B, a plurality of battery types may selectively be used instead of a single battery type, and the supply of power may be controlled by the auxiliary control blocks 700 and 700'. Thus, a variety of battery types may be used in combination, and an effect of cost reduction may also be obtained as required.

In addition, hereinafter, the auxiliary control block 700 will be described by referring to an auxiliary control block structure with the converter 710 disposed therein (see FIG. 2A). When a short circuit has occurred in the LDC 100, the auxiliary control block 700 having this structure may compare a voltage of the main battery 200 and a voltage of the auxiliary battery and selectively control flow of current in a forward direction or a reverse direction using the converter 710 disposed therein.

More specifically, as illustrated in FIG. 4, in a situation in which the LDC 100 is determined to have a short circuit, when the voltage of the main battery 200 is greater than the voltage of the auxiliary battery 400, the auxiliary control block 700 may control current to flow through the converter 710 in the forward direction, whereby the auxiliary battery 400 is charged using the main battery 200. In addition, power is supplied to the junction block 500 using the main battery 200, whereby the vehicle moves in an emergency mode.

Here, in a situation in which the control block 300 allows the vehicle to move in the emergency mode by being supplied with power from the main battery 200 as described above, when the SOC of one of the main battery 200 or the auxiliary battery 400, more particularly, the SOC of the main battery 200 is determined to be less than a predetermined reference SOC, the control block 300 may turn off the load switch 330 so that power is only supplied to the essential load part 500a.

That is, as illustrated in FIG. 5, the control block 300 may selectively turn off the load switch 330 so that power from the LDC 100 is only supplied to the essential load part 500a, thereby allowing power to selectively be supplied to the essential load part 500a including the load for a safe emergency stop, the load for securing the driver's safety in an emergency, the driving-related load, etc. Consequently, it is possible to extend the power supply time in which the vehicle having a failure may drive in the same manner as in a normal situation, thereby improving driving stability of the vehicle.

In contrast, when the voltage of the auxiliary battery 400 is greater than the voltage of the main battery 200, the auxiliary control block 700 controls flow of current through the converter 710 in the reverse direction so as to charge the main battery 200 using the auxiliary battery 400. In addition, power is supplied to the junction block 500 using the auxiliary battery 400, thereby allowing the vehicle to move in the emergency mode.

Here, in a situation in which the control block 300 allows the vehicle to move in the emergency mode by being supplied with power from the auxiliary battery 400 as described above, when the SOC of one of the main battery 200 or the auxiliary battery 400, more particularly, the SOC of the auxiliary battery 400 is determined to be less than the predetermined reference SOC, the control block 300 may turn off the load switch 330 so that power is only supplied to the essential load part 500a including the load for a safe emergency stop, the load for securing the driver's safety in an emergency, the driving-related load, etc. Consequently, it is possible to extend the power supply time in which the vehicle having short circuit due to an accident may drive in the same manner as in a normal situation, thereby improving driving stability of the vehicle.

Figure 8A:
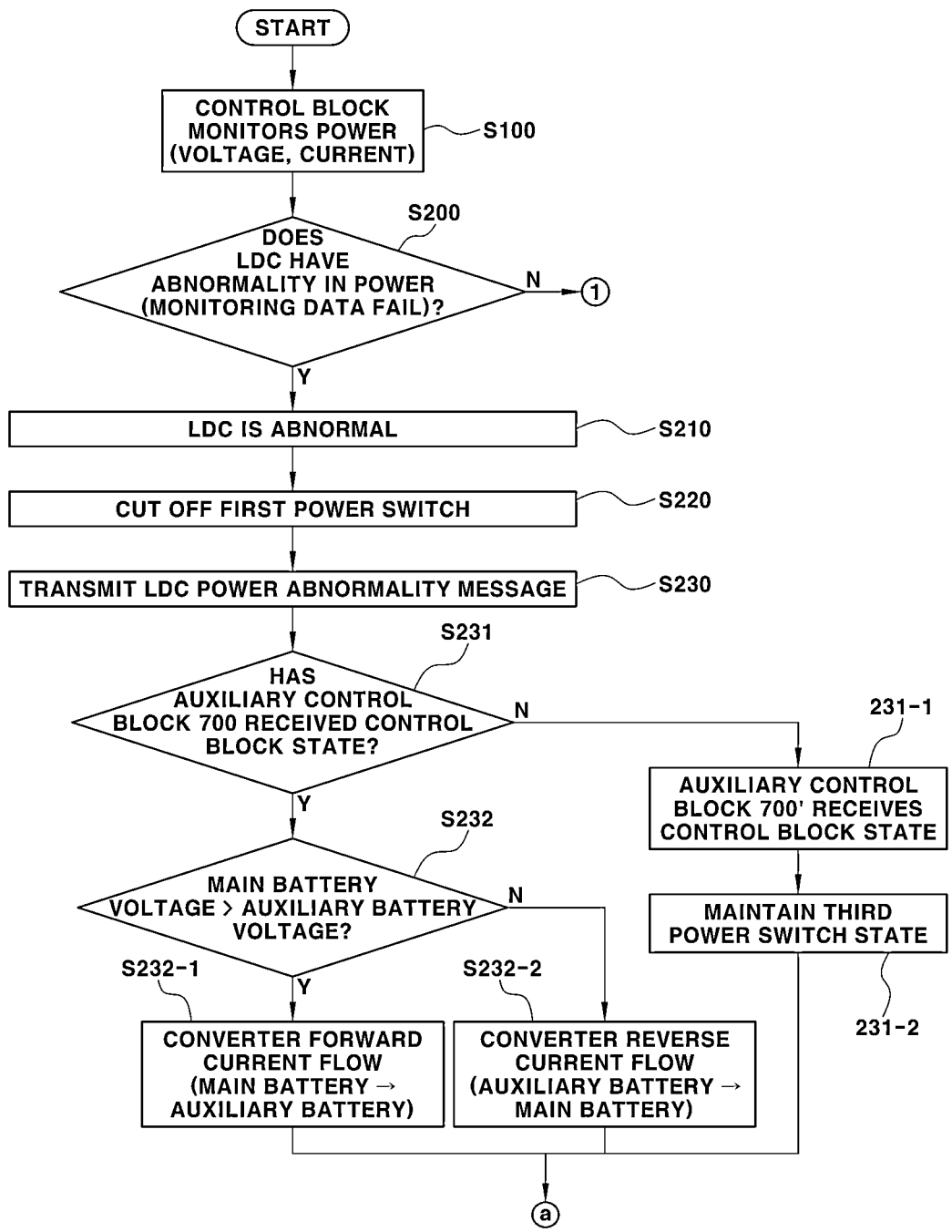
FIG. 8A-8B is a flowchart sequentially illustrating a power supply control method for an autonomous vehicle according to another embodiment.
Figure 8B:
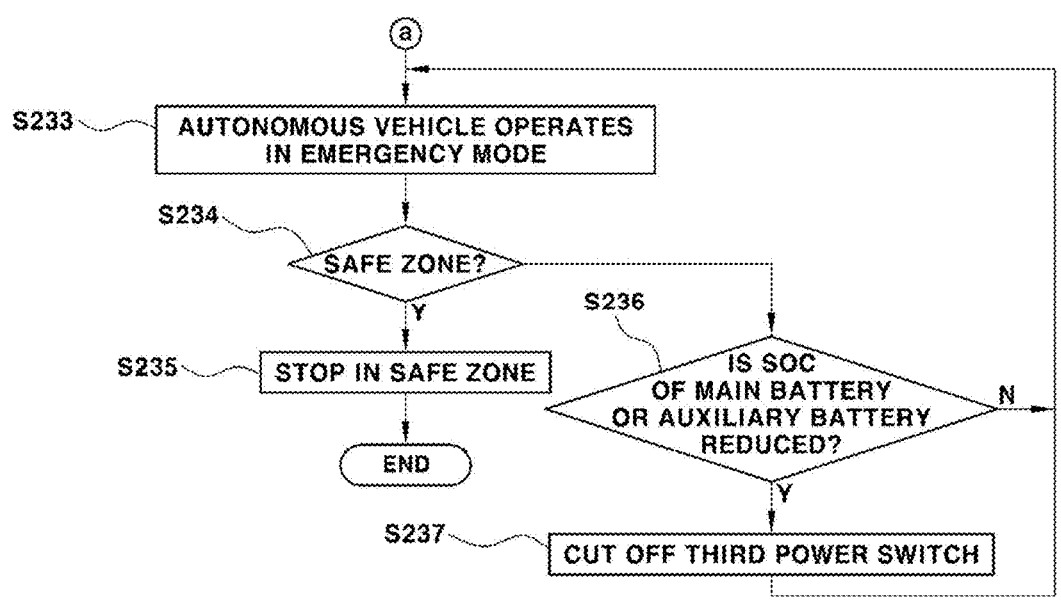
Figure 9:
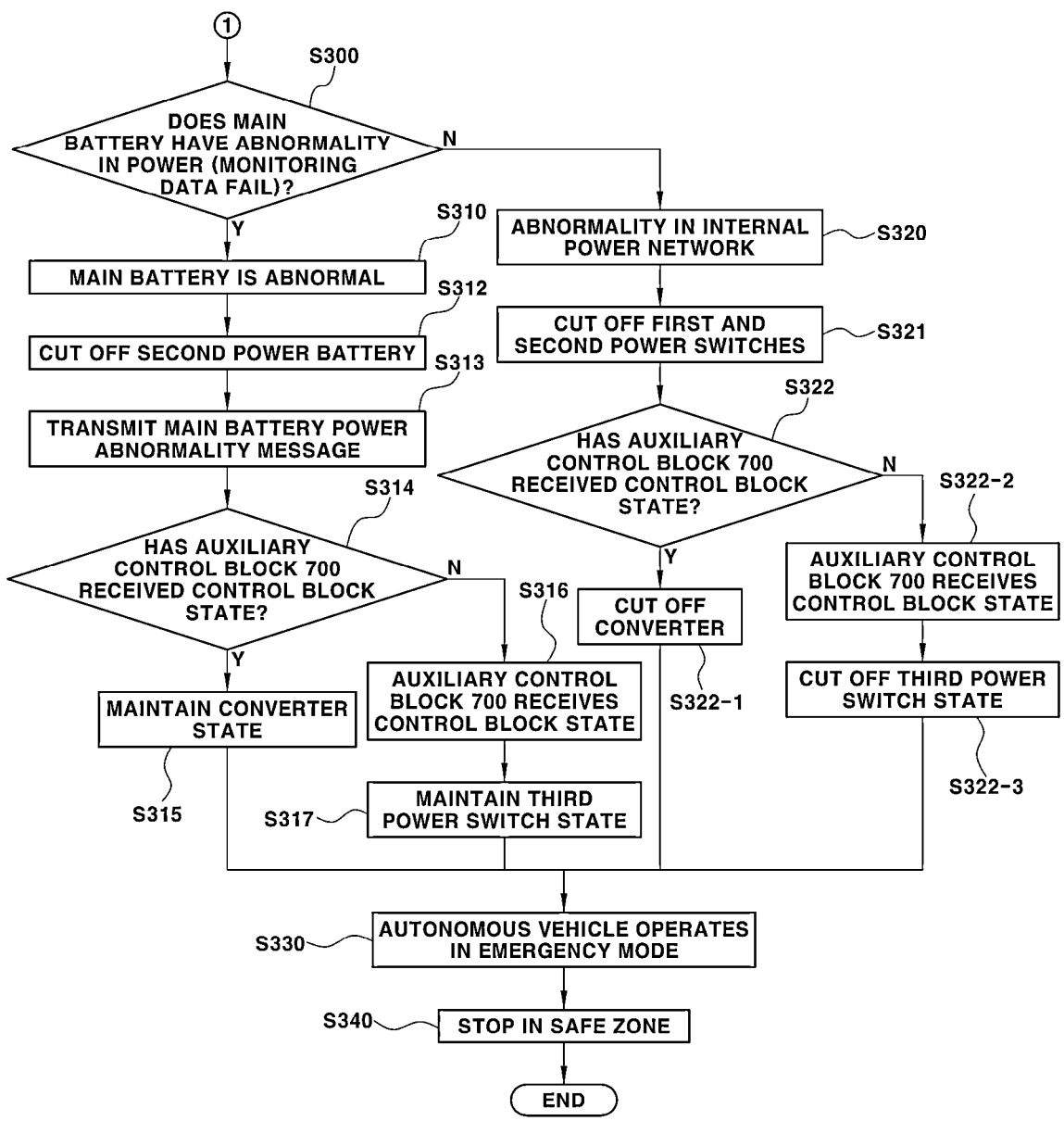
FIG. 9 is a flowchart illustrating the first control method of the power supply control method for an autonomous vehicle according to the other embodiment illustrated in FIG. 8.

FIG. 8 is a flowchart sequentially illustrating a power supply control method for an autonomous vehicle according to another embodiment of the present disclosure, and FIG. 9 is a flowchart illustrating the first control method of the power supply control method for an autonomous vehicle according to the other embodiment of the present disclosure illustrated in FIG. 8.

The power supply control method for an autonomous vehicle according to the present embodiment as illustrated in FIG. 8 will be sequentially described as follows.

During operation of an autonomous driving system, power (e.g., a voltage or current) output from the control block 300 is monitored in S100. When an abnormality in the power (e.g., a voltage or current) output from the control block 300 is detected, whether or not the LDC 100 has a short circuit is determined in S200.

Here, when an abnormality due to the short circuit of the LDC 100 is determined according to such monitoring information in S210, the first power switch 310 is turned off in S220, and a message regarding the occurrence of the abnormality in the LDC 100 is transmitted to the blocks 700 and 700' via controller area network (CAN) communication in S230.

When the auxiliary control block 700 is determined to have received this message in S231, the size of the voltage between the main battery 200 and the auxiliary battery 400 is compared in S232. Then, flow of current is selectively controlled in a forward direction or a reverse direction using the converter 710 disposed inside the auxiliary control block 700.

Here, when the voltage of the main battery 200 is greater than the voltage of the auxiliary battery 400, the flow of current through the converter 710 is controlled to be in the forward direction, whereby the auxiliary battery 400 is charged using the main battery 200 in S232-1. In S233, power is supplied to the junction block 500 using the main battery 200, whereby the vehicle moves in an emergency mode.

In contrast, when the voltage of the auxiliary battery 400 is greater than the voltage of the main battery 200, the auxiliary control block 700 controls the converter 710 to change the flow of current in the reverse direction so as to charge the main battery 200 using the auxiliary battery 400 in S232-2. In S233, the auxiliary control block 700 supplies power to the junction block 500 using the auxiliary battery 400, thereby allowing the vehicle to move in the emergency mode.

As described above, when the vehicle moves in the emergency mode, whether or not the vehicle has moved to a safe zone is determined by receiving information from the driver in S234. When the vehicle is determined to have moved to the safe zone, the vehicle is determined to have stopped, and the power supply system is terminated in S237.

In contrast, when the vehicle is not determined to have moved to the safe zone in S234, a reduction in the SOC of the main battery 200 or the SOC of the auxiliary battery 400 is reviewed in accordance with the forward or reverse flow of current according to the above-described difference of the voltage between the main battery 200 and the auxiliary battery 400.

When the SOC of the main battery 200 is determined to be less than the predetermined reference SOC, i.e., the main battery 200 is in an SOC-reduced state in S236, the load switch 330 is turned off, thereby allowing power to only be supplied to the essential load part 500a in S237.

Consequently, when an abnormality has occurred in the LDC 100 in S210, power from the charged auxiliary battery 400 may only be supplied to the essential load part 500a (see S232-2) as described above, whereby only the essential load part 500a including the load for a safe emergency stop, the load for securing the driver's safety in an emergency, the driving-related load, etc. may selectively be supplied with power. As a result, the power supply time in which the vehicle having a failure may drive in the same manner as in a normal situation may be extended, thereby improving driving stability of the vehicle before stopping in a safe zone.

In addition, when it is determined that the abnormality has occurred in the LDC 100 in S210, power from the main battery 200 is only supplied to the essential load part 500*a* (see S232-1) as described above, whereby only the essential load part 500*a* including the load for a safe emergency stop, the load for securing the driver's safety in an emergency, the driving-related load, etc. may selectively be supplied with power. As a result, the power supply time in which the vehicle having a failure may drive in the same manner as in a normal situation may be extended, thereby improving driving stability of the vehicle before stopping in a safe zone.

When the structure including the third power switch 720 inside the auxiliary control block 700' (see FIG. 2B) is used in the operation S231 of receiving the message containing short circuit-related information by the auxiliary control block 700', the auxiliary control block 700' may receive the short circuit-related information from the control block 300 in S231-1. When the LDC 100 has the short circuit, in addition to the turning-on of the second power switch 320, the third power switch 720 is turned on in S231-2. Consequently, the vehicle may move in the emergency mode in response to power being supplied from the main battery 200 and the auxiliary battery 400 in S233.

The following process S234 to S237, i.e., the process taken before the movement of the vehicle to the safe zone is the same as in the above-described embodiment, and thus a description thereof will be omitted.

In addition, as illustrated in FIG. 9, when no short circuit has occurred in the LDC 100 in S200, whether or not the main battery 200 configured to supply power to the junction block 500 is determined in S300.

In the operation S310 in which the control block 300 determine the main battery 200 has the short circuit through power monitoring, the second power switch 320 is turned off in S312, and a message indicating an abnormality in the main battery 200 is transmitted to the auxiliary control blocks 700 and 700' via CAN communication in S313.

Afterwards, when the auxiliary control block 700 receives information regarding the occurrence of a short circuit in the main battery 200 in S314, the state of the converter 710 of the auxiliary control block 700 is maintained, i.e., flow of current is set to be in a forward direction using the LDC 100 so that the auxiliary battery 400 may be charged in S315. Consequently, in a state in which the first power switch 310 is turned on, the vehicle is allowed to move in the emergency mode using the LDC 100 and the auxiliary battery 400 in S330. As a result, when the vehicle is determined to have stopped in the safe zone in S340, the power supply system is terminated.

Here, in a situation in which the structure including the third power switch 720 inside the auxiliary control block 700' is used (see FIG. 2B), the auxiliary control block 700' receives the information regarding the occurrence of a short circuit in the main battery 200 from the control block 300 in S316. In a state in which the main battery 200 has the short circuit, in addition to the turned-on of the first power switch 310, the third power switch 720 is turned on in S317. Consequently, the vehicle may move in the emergency mode in response to power being supplied from the LDC 100 and the auxiliary battery 400 in S330.

As a result of the determination S300 of whether or not the main battery 200 has a short circuit by the control block 300, when the main battery 200 is determined to have no short circuit, i.e., it is determined that there is no power abnormality in the LDC 100 or the main battery 200, it is determined that an internal power network of the power supply system has an abnormality in S320, and the first power switch 310 and the second power switch 320 are turned off in S321.

Afterwards, the auxiliary control blocks 700 and 700' receive information regarding the occurrence of abnormality in the internal power network of the power supply system from the control block 300 in S322-1 and control the converter 710 and the third power switch 720 to be turned off in S322-3. Consequently, in S330, the vehicle is allowed to move in the emergency mode to stop in the safe zone by the auxiliary junction block 600 to which the driving-related redundancy load, such as MDPS2 or RCU, is connected through the supply of power.

According to the present disclosure, when the LDC has a failure, power is supplied to the vehicle through the battery. When the voltage of the battery is reduced or the voltage of the battery is insufficient for an emergency mode operation for stopping in the safe zone, the essential load switch is controlled so that the supply of power to some loads is selectively cut off. Consequently, the supply of power may be converted to the essential loads to obtain the safety of the driver.

Accordingly, the present disclosure may remove a risk in the autonomous vehicle resulting from no supply of power to the essential loads, thereby providing stability to the driving vehicle.

Although the exemplary embodiments of the present disclosure have been described for illustrative purposes, those skilled in the art will appreciate that various modifications, additions, and substitutions are possible, without departing from the scope and spirit of the present disclosure as disclosed in the accompanying claims.

What is claimed is:

1. A power supply system for a vehicle, the power supply system comprising:
   a low voltage DC/DC converter (LDC) configured to convert a high voltage into a low voltage;
   a main battery configured to be charged by the LDC and to supply power to a junction block divided into an essential load part and a general load part;
   a control block comprising a first power switch configured to control power between the LDC and the junction block, a second power switch configured to control power between the main battery and the junction block, and a load switch configured to selectively cut off the power to the general load part;
   an auxiliary battery configured to selectively supply power to an auxiliary junction block; and
   an auxiliary control block configured to supply the power from the auxiliary battery to the auxiliary junction block, wherein the auxiliary control block is configured to:
   control power from the auxiliary battery to the main battery in response to a short in the LDC,
   compare a voltage of the main battery and a voltage of the auxiliary battery; and
   selectively control a current to flow in a forward direction or a reverse direction using a converter disposed therein.

2. The power supply system of claim 1, wherein the control block is configured to turn off the first power switch and to turn on the second power switch in response to the short in the LDC so that the power is supplied from the main battery to the junction block.

3. The power supply system of claim 1, wherein the control block is configured to:

turn off the first power switch in response to the short in the LDC, turn off the load switch when a state of charge (SOC) of the main battery is determined to be less than a predetermined reference SOC so that the power from the main battery is only supplied to the essential load part.

4. The power supply system of claim 1, wherein the control block is configured to turn off the second power switch in response to a short in the main battery so that the power is supplied from the LDC to the junction block.

5. The power supply system of claim 1, wherein the control block is configured to turn off the first power switch and the second power switch in response to the short in the LDC and the main battery so that the power is supplied from the auxiliary battery to the junction block and to the auxiliary junction block.

6. The power supply system of claim 1, wherein the auxiliary control block is configured to control the current to flow through the converter in the forward direction when the voltage of the main battery is greater than the voltage of the auxiliary battery so that the auxiliary battery is charged using the main battery and so that power is supplied to the junction block using the main battery, and wherein the vehicle is configured to move in an emergency mode.

7. The power supply system of claim 6, wherein the control block is configured to turn off the load switch when a SOC of the main battery is determined to be less than a predetermined reference SOC and when the vehicle is allowed to move in the emergency mode so that the power is only supplied to the essential load part.

8. The power supply system of claim 1, wherein the auxiliary control block is configured to control the current to flow through the converter in the reverse direction when the voltage of the auxiliary battery is greater than the voltage of the main battery so that the main battery is charged using the auxiliary battery and so that the power is supplied to the junction block using the auxiliary battery, and wherein the vehicle is configured to move in an emergency mode.

9. The power supply system of claim 8, wherein the control block is configured to turn off the load switch when a SOC of the auxiliary battery is determined to be less than a predetermined reference SOC and when the vehicle is allowed to move in the emergency mode so that the power is only supplied to the essential load part.

10. The power supply system of claim 1, wherein the auxiliary control block is configured to selectively control a third power switch in response to the short in the LDC, the third power switch being part of the auxiliary control block.

11. The power supply system of claim 1, wherein the LDC comprises a plurality of LDCs, each LDC connected to the control block and the auxiliary junction block.

12. A method for controlling a power supply of a vehicle, the method comprising:

determining whether a short occurred in a low voltage DC/DC converter (LDC) by monitoring power to a control block when an instability in the power supply is detected;

when the short is determined, turning off a first power switch of the control block;

when no short is determined, determining whether a short occurred in a main battery, wherein the main battery supplies power to a junction block;

when the short is determined in the main battery, turning off a second power switch of the control block and supplying power via an auxiliary battery through an auxiliary control block to the junction block and an auxiliary junction block; and when no short is determined in the LDC or the main battery and when it is determined that an internal power network of a power supply system is abnormal, turning off the first power switch and the second power switch to prevent power from being supplied from the auxiliary battery to the junction block, and supplying power from the auxiliary battery to the auxiliary junction block, wherein the vehicle moves in an emergency mode.

13. The method of claim 12, wherein turning off the first power switch when the short occurred in the LDC comprises comparing a voltage of the main battery and a voltage of the auxiliary battery and selectively controlling a current to flow in a forward direction or a reverse direction using a converter disposed in the auxiliary control block.

14. The method of claim 13, wherein turning off the first power switch when the voltage of the main battery is greater than the voltage of the auxiliary battery comprises controlling the current to flow through the converter in the forward direction so that the auxiliary battery is charged using the main battery, and supplying power to the junction block using the main battery, and wherein the vehicle moves in the emergency mode.

15. The method of claim 14, wherein turning off the first power switch when a state of charge (SOC) of the main battery is determined to be less than a predetermined reference SOC and when the vehicle moves in the emergency mode comprises turning off a load switch so that power is only supplied to an essential load part of a junction box comprising the essential load part and a general load part.

16. The method of claim 13, wherein turning off of the first power switch when the voltage of the auxiliary battery is greater than the voltage of the main battery comprises controlling the current to flow through the converter in the reverse direction so that the main battery is charged using the auxiliary battery, and supplying power to the junction block using the auxiliary battery, and wherein the vehicle moves in the emergency mode.

17. The method of claim 16, wherein turning off of the first power switch when the voltage of the main battery is determined to be less than a predetermined reference SOC comprises turning off a load switch so that power is only supplied to an essential load part of a junction box comprising the essential load part and a general load part.

\* \* \* \* \*

UNITED STATES PATENT AND TRADEMARK OFFICE
CERTIFICATE OF CORRECTION

PATENT NO. : 12,233,721 B2
APPLICATION NO. : 18/213637
DATED : February 25, 2025
INVENTOR(S) : Park et al.

Page 1 of 1

It is certified that error appears in the above-identified patent and that said Letters Patent is hereby corrected as shown below:

In the Claims

In Column 12, in Claim 1, Line 55, delete "LDC," and insert -- LDC; --.

In Column 14, in Claim 16, Line 42, after "turning off" delete "of".

In Column 14, in Claim 17, Line 50, after "turning off" delete "of".

Signed and Sealed this
Twenty-ninth Day of April, 2025

Coke Morgan Stewart
*Acting Director of the United States Patent and Trademark Office*